US008024332B2

(12) United States Patent
Cao et al.

(10) Patent No.: US 8,024,332 B2
(45) Date of Patent: Sep. 20, 2011

(54) CLUSTERING QUESTION SEARCH RESULTS BASED ON TOPIC AND FOCUS

(75) Inventors: Yunbo Cao, Beijing (CN); Chin-Yew Lin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 12/185,702

(22) Filed: Aug. 4, 2008

(65) Prior Publication Data

US 2010/0030769 A1  Feb. 4, 2010

(51) Int. Cl.
G06F 17/30 (2006.01)
G06F 7/00 (2006.01)
(52) U.S. Cl. ...................................................... 707/728
(58) Field of Classification Search .................. None
See application file for complete search history.

(56) References Cited

U.S. PATENT DOCUMENTS

| | | | |
|---|---|---|---|
| 6,028,601 | A | 2/2000 | Machiraju et al. |
| 6,665,666 | B1 | 12/2003 | Brown et al. |
| 6,804,670 | B2 | 10/2004 | Kreulen et al. |
| 7,231,384 | B2 * | 6/2007 | Wu et al. ................. 707/999.003 |
| 7,349,899 | B2 * | 3/2008 | Namba .................. 707/999.006 |
| 2002/0087520 | A1 * | 7/2002 | Meyers ............................ 707/3 |
| 2002/0111934 | A1 * | 8/2002 | Narayan ............................ 707/1 |
| 2004/0249808 | A1 | 12/2004 | Azzam et al. |
| 2006/0078862 | A1 | 4/2006 | Goto et al. |
| 2006/0136455 | A1 | 6/2006 | Wen et al. |
| 2007/0005566 | A1 | 1/2007 | Bobick et al. |
| 2008/0005075 | A1 | 1/2008 | Horvitz et al. |
| 2008/0228738 | A1 * | 9/2008 | Li ..................................... 707/3 |
| 2008/0288454 | A1 * | 11/2008 | Swadi .............................. 707/3 |

FOREIGN PATENT DOCUMENTS

| | | |
|---|---|---|
| WO | WO-2007108788 | 9/2007 |
| WO | WO-2008022150 | 2/2008 |

OTHER PUBLICATIONS

Jeon et al., "Finding Semantically Similar Questions Based on Their Answers," SIGIR'05, Aug. 15-19, 2005, Salvador, Brazil 84-90 pages.*

Aslam et al., "The Star Clustering Algorithm for Static and Dynamic Information Organization," Journal of Graph Algorithms and Applications, vol. 8, No. 1, 2004, pp. 95-129.

Burke et al., "Question Answering from Frequently-Asked Question Files: Experiences with the FAQ Finder System," The University of Chicago, Technical Report TR-97-05, Jun. 1997, pp. 1-37.

(Continued)

*Primary Examiner* — Sathyanarayan Pannala
(74) *Attorney, Agent, or Firm* — Perkins Coie LLP

(57) ABSTRACT

A method and system for presenting questions that are relevant to a queried question based on clusters of topics and clusters of focuses of the questions is provided. A question search system provides a collection of questions. Each question of the collection has an associated topic and focus. Upon receiving a queried question, the question search system identifies questions of the collection that may be relevant to the queried question and generates a score or ranking indicating relevance of the identified questions. The question search system clusters the identified questions into topic clusters of questions with similar topics. The question search system may also cluster the questions within each topic cluster into focus clusters of questions with similar focuses.

14 Claims, 9 Drawing Sheets

OTHER PUBLICATIONS

Cao et al., "Base Noun Phrase Translation Using Web Data and the EM Algorithm," International Conference on Computational Linguistics, 2002, 7 pages.

Fredkin, "Trie Memory," Communication of the ACM, vol. 3, Issue 9, Sep. 1960, pp. 490-499.

Jeon et al., "Finding Similar Questions in Large Question and Answer Archives," CIKM'05, Oct. 31-Nov. 5, 2005, Bremen, Germany, pp. 84-90.

Lai et al., "FAQ Mining via List Detection," International Conference on Computational Linguistics, 2002, pp. 1-7.

Li et al., "Generalizing Case Frames Using a Thesaurus and the MDL Principle," Computational Linguistics vol. 24, No. 2, 1998, pp. 217-244.

Lita et al., "Instance-Based Question Answering: A Data-Driven Approach," Association for Computational Linguistics, ACL Jul. 21-26, 2004, 8 pages.

Ponte et al., "A Language Modeling Approach to Information Retrieval," ACM SIGIR, 1998, pp. 275-281.

Rissanen, "Modeling by shortest data description," Automatica, vol. 14, 1978, pp. 465-471.

Sneiders, "Automated question answering using question templates that cover the conceptual model of the database," In Proc. of the 6th International Conference on Applications of Natural Language to Information Systems, 2002, pp. 235-239.

Wang et al., "Learn from Web Search Logs to Organize Search Results," SIGIR'07, Jul. 23-27, 2007, Amsterdam, The Netherlands, 8 pages.

Wen et al., "Clustering User Queries of a Search Engine," WWW10, May 1-5, 2001, Hong Kong, pp. 162-168.

"WordNet: An Electric Lexical Data Base," Princeton University 2006, http://wordnet.princeton.edu, [Internet accessed May 15, 2008].

Zamir et al., "Grouper: A Dynamic Clustering Interface to Web Search Result," The International Journal of Computer and Telecommunications Meeting, vol. 31, Issue 11-16, May 1999, 15 pages.

Zeng et al., "Learning to Cluster Web Search Results," SIGIR'04, Jul. 25-29, Sheffield, South Yorkshire, 8 pages.

\* cited by examiner

Question: Any cool club in Berlin or Hamburg? — 201

Fun clubs in Hamburg or Berlin
What are the fun clubs in Berlin or Hamburg
Clubs in Hamburg
Where are nightclubs in Berlin
What is a good restaurant in Hamburg or Berlin
Any nice hotels in Hamburg or Berlin
Is there a five-star hotel in Hamburg
How long does it take to get to Berlin from Hamburg
What is a cheap hotel in Berlin
What is a nice hotel in Hamburg

CLUSTERING QUESTION SEARCH RESULTS BASED ON TOPIC AND FOCUS

CROSS-REFERENCE TO RELATED APPLICATION(S)

This application relates to U.S. patent application Ser. No. 12/185,713, filed on Aug. 4, 2008 entitled "SEARCHING QUESTIONS BASED ON TOPIC AND FOCUS," which is hereby incorporated by reference in its entirety.

BACKGROUND

Many search engine services, such as Google and Live Search, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page importance or popularity (e.g., Google's PageRank), and so on. The search engine service then displays to the user links to those web pages in an order that is based on a ranking that may be determined by their relevance, popularity, or some other measure.

Some online services, such as Yahoo! Answers and Live QnA, have created large collections of questions and their corresponding answers. These Q&A services may provide traditional frequently asked question ("FAQ") services or may provide community-based services in which members of the community contribute both questions and answers to those questions. These Q&A services provide a mechanism that allows users to search for previously generated answers to previously posed questions. These Q&A services typically input a queried question from a user, identify questions of the collection that relate to the queried question (i.e., a question search), and return the answers to the identified questions as the answer to the queried question.

Such Q&A services typically treat the questions as plain text. The Q&A services may use various techniques including a vector space model and a language model when performing a question search. Table 1 illustrates example results of a question search for a queried question.

TABLE 1

Queried Question:

Q1: Any cool clubs in Berlin or Hamburg?
Expected Question

Q2: What are the best/most fun clubs in Berlin?
Not Expected Question:

TABLE 1-continued

Q3: Any nice hotels in Berlin or Hamburg?
Q4: How long does it take to get to Hamburg from Berlin?
Q5: Cheap hotels in Berlin?

Such Q&A services may identify questions Q2, Q3, Q4, and Q5 as being related to queried question Q1. The Q&A services typically cannot determine, however, which identified question is most related to the queried question. In this example, question Q2 is most closely related to queried question Q1. The Q&A services nevertheless provide a ranking of the relatedness of the identified questions to the queried questions. Such a ranking may represent the queried question and each identified question as a feature vector of keywords. The relatedness of an identified question to the queried question is based on the closeness of their feature vectors. The closeness of the feature vectors may be determined using, for example, a cosine similarity metric.

The Q&A services typically display the identified questions to a user in rank order. A difficulty with such displaying of the identified questions is that many of the highest ranking questions may be very similar in both syntax and semantics. For example, the identified questions for the example of Table 1 may also include the additional questions of Table 2.

TABLE 2

Q6: Fun clubs in Berlin or Hamburg?
Q7: What's a good restaurant in Hamburg or Berlin?

Because questions Q2 and Q6 have several words in common with queried question Q1, a Q&A service may rank those questions high. Depending on the size of the collection of questions, there may be many questions similar to questions Q2 and Q6. If all these similar questions are ranked high, then the first page of the search results may list only such similar questions. If the user is actually interested in hotels that have health clubs, then the user may need to scan several pages before finding a listing for a hotel or a hotel with a health club that is of interest.

SUMMARY

A method and system for presenting questions that are relevant to a queried question based on clusters of topics and clusters of focuses of the questions is provided. A question search system provides a collection of questions. Each question of the collection has an associated topic and focus. The topic of a question represents the major context/constraint of a question that characterizes the interest of the user who submits the question. The focus of a question represents certain aspects or descriptive features of the topic of the question in which the user is interested. Upon receiving a queried question, the question search system identifies questions of the collection that may be relevant to the queried question and generates a score or ranking indicating relevance of the identified questions. The question search system clusters the identified questions into topic clusters of questions with similar topics. The question search system may rank the topic clusters based on a ranking of the original ranking of the questions within the topic clusters and may display information relating to the topic clusters in ranked order. The question search system may also cluster the questions within each topic cluster into focus clusters of questions with similar focuses. The question search system may rank the focus clusters within each topic cluster based on a ranking of the original ranking of the questions within the focus clusters and may display information relating to the focus clusters in ranked order. The question search system may display a list of the topic clusters and allow a user to select a topic cluster to display the focus clusters within the selected topic cluster.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a diagram that illustrates a display page with a conventional display of search results of a question search.

DETAILED DESCRIPTION

Figure 1:
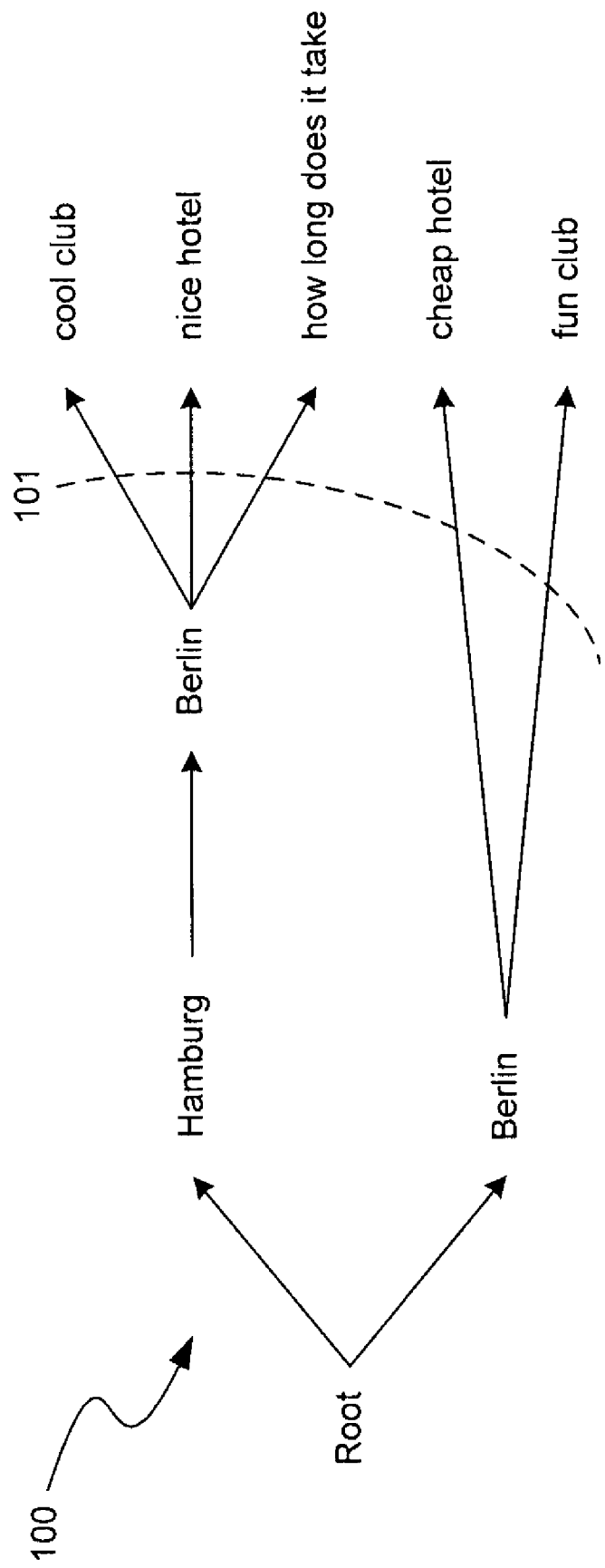
FIG. 1 is a diagram that illustrates an example question tree.

A method and system for presenting questions that are relevant to a queried question based on clusters of topics and clusters of focuses of the questions is provided. In some embodiments, a question search system provides a collection of questions. Each question of the collection has an associated topic and focus. The topic of a question represents the major context/constraint of a question that characterizes the interest of the user who submits the question. For example, the question "Any cool clubs in Berlin or Hamburg?" has the topic of "Berlin Hamburg" (removing stop words). The focus of a question represents certain aspects or descriptive features of the topic of the question in which the user is interested. For example, the sample question has the focus of "cool clubs," which describes, refines, or narrows the user's interest in the topic of the question. Upon receiving a queried question, the question search system identifies questions of the collection that may be relevant to the queried question and generates a score or ranking indicating relevance of the identified questions. The question search system may use any conventional technique for identifying and ranking the questions. Alternatively, the question search system may use the techniques described in U.S. patent application Ser. No. 12/185,713, entitled "Searching Questions Based on Topic and Focus" and filed on Aug. 4, 2008, which is hereby incorporated by reference. The question search system clusters the identified questions into topic clusters of questions with similar topics. The question search system may rank the topic clusters based on a ranking of the original ranking of the questions within the topic clusters and may display information relating to the topic clusters (e.g., the topic, the questions within the cluster, or the answers to the questions within the cluster) in ranked order. For example, the question search system may generate a topic cluster for questions with the topic of "Hamburg Berlin" and separate clusters for questions with the topics of "Hamburg" and "Berlin." The question search system may also cluster the questions within each topic cluster into focus clusters of questions with similar focuses. The question search system may rank the focus clusters within each topic cluster based on a ranking of the original ranking of the questions within the focus clusters and may display information relating to the focus clusters (e.g., the focus, the questions within the cluster, or the answers to the questions within the cluster) in ranked order. For example, the question search system may generate a focus cluster for the focus of "fun clubs" within the topic cluster for the topic of "Hamburg Berlin" and separate focus clusters for questions with the focuses of "restaurant" and "hotel." The question search system may display a list of the topic clusters and allow a user to select a topic cluster to display the focus clusters within the selected topic cluster. The question search system may also allow the user to select a focus cluster to display the questions within the selected focus cluster. In this way, the question search system can provide a user with an overview of the different topics and their different focuses of semantically related questions without having to view all the questions in their original ranked order.

In some embodiments, the question search system identifies the topics and focuses of a collection of questions using a minimum description length ("MDL") tree cut model. Such identification of topics and focuses is described in U.S. patent application Ser. No. 12/098,457, entitled "Recommending Questions to User of Community Question Answering" and filed on Apr. 7, 2008, which is hereby incorporated by reference. A "cut" of a tree is any set of nodes in the tree that defines the partition of all nodes viewing each node as representing a set of its child nodes as well as itself. The question search system generates a "question tree" for questions of the collection by identifying base noun phrases and WH-ngrams of the question. A base noun phrase is a simple and nonrecursive noun phrase, and a WH-ngram is an n-gram beginning with the WH-words: when, what, where, which, and how. The question search system calculates the specificity of a term (e.g., base noun phrase or WH-word) to indicate how well the term characterizes the information needs of a user who posts a question. The question search system then generates a topic chain for each question, which is a list of the terms of a question ordered from highest to lowest specificity. For example, the topic chain of the question "Any cool clubs in Berlin or Hamburg?" may be "Hamburg→Berlin→cool club" because the specificity for Hamburg, Berlin, and cool club may be 0.99, 0.62, and 0.36, respectively. The topic chains for the questions of Table 1 are illustrated in Table 3.

TABLE 3

| Queried Question: |
| --- |
| Q1: Hamburg→Berlin→cool club<br>Expected Question |
| Q2: Berlin→fun club<br>Not Expected Question: |
| Q3: Hamburg→Berlin→nice hotel |

TABLE 3-continued

Q4: Hamburg→Berlin→how long does it take
Q5: Berlin→cheap hotels

FIG. 1 is a diagram that illustrates an example question tree. The question tree 100 represents the topic chains of Table 3. The connected nodes of Hamburg, Berlin, and cool club represent the topic chain of "Hamburg→Berlin→cool club." The cut of the question tree is represented by the dashed line 101. The terms before (to the left of) the cut represent the topics, and the terms after (to the right of) the cut represent the focuses. The topic of the question "Any cool clubs in Berlin or Hamburg?" is thus "Hamburg Berlin," and the focus of that question is "cool club."

In some embodiments, the question search system uses a language modeling framework to define the similarity between questions. (See Ponte, J. M. and Croft, W. B., "A Language Modeling Approach to Information Retrieval," Proc. of SIGIR'98, 1998.) A language modeling framework models the probability of generating one question from a language model estimated by another question. The question search system may represent that probability by the following equation:

$$p(Q_1 | Q_2) = \prod_{w \in Q_1} \tilde{p}(w | Q_2)^{count(w,Q_1)} \quad (1)$$

where $p(Q_1|Q_2)$ represents the probability of generating question $Q_1$ from the language model of question $Q_2$, $p(w|Q_2)$ represents the Maximum Likelihood Estimation of the language model of the question $Q_2$ for term w, and $count(w,Q_1)$ represents the number of occurrences of term w in question $Q_1$.

The question search system represents the similarity between questions by a symmetric function represented by the following equation:

$$sim(Q_1,Q_2)=p(Q_1|Q_2)+p(Q_2|Q_1) \quad (2)$$

where $sim(Q_1,Q_2)$ represents the similarity between questions $Q_1$ and $Q_2$. The question search system may also represent the similarity between the topics and the focuses of questions in an analogous manner using the following equations:

$$sim(T(Q_1),T(Q_2))=p(T(Q_1)|T(Q_2))+p(T(Q_2)|T(Q_1)) \quad (3)$$

$$sim(F(Q_1),F(Q_2))=p(F(Q_1)|F(Q_2))+p(F(Q_2)|F(Q_1)) \quad (4)$$

wherein $T(Q_1)$ represents the topic of question $Q_1$, $F(Q_1)$ represents the focus of question $Q_1$, $sim(T(Q_1),T(Q_2))$ represents the similarity between the topics of questions $Q_1$ and $Q_2$, and $sim(F(Q_1), F(Q_2))$ represents the similarity between the focuses of questions $Q_1$ and $Q_2$.

In some embodiments, the question search system uses a star clustering algorithm to generate topic clusters and focus clusters. One skilled in the art will appreciate, however, that a variety of well-known clustering techniques may be used, such as a nearest neighbor clustering and K-means clustering. The star clustering algorithm is based on graph partitioning. (See Wang, X. and Zhai, C., "Learn from Web Search Logs to Organize Search Results," Proc. of SIGIR'07, 2007, and Aslam, J. A., Pelekov, E., and Rus, D., "The Star Clustering Algorithm for Static and Dynamic Information Organization," Journal of Graph Algorithms and Applications, 8(1): 95-129, 2004.) Each clustering unit (e.g., question) is considered to be a node in an undirected graph. The algorithm calculates the similarity sim(u,v) between each two clustering units u and v. The algorithm adds a link between each pair of nodes whose similarity is above a threshold similarity. Thus, a link between two nodes indicates that the questions represented by the nodes are similar in some way (e.g., similar overall, similar topics, or similar focuses). The star clustering algorithm is illustrated in Table 4.

TABLE 4

For any threshold σ:

1. Let graph $G_\sigma = (V, E_\sigma)$ where $E_\sigma = \{(u, v): sim(u, v) \geq \sigma, u \in V, v \in V\}$.
2. Let each vertex in $G_\sigma$ initially be unmarked.
3. Calculate the degree of each vertex $v \in V$.
4. From the unmarked vertices, find the unmarked vertex μ that has the highest degree and mark its flag as a center.
5. Form a cluster C containing μ and all its neighbors that are not marked.
6. Mark all the selected neighbors as satellites.
7. Repeat steps 4-6 until all vertices are marked.
8. Represent each cluster by the vertex corresponding to its associated star center.

In this table, $G_\sigma$ represents a graph of vertices (nodes) and edges (links) with edges between similar vertices, V represents the vertices, $E_\sigma$ represents edges between vertices whose similarity is above the similarity threshold of σ, the degree of a vertex represents the number of edges connecting that vertex to other vertices, and neighbor vertices are vertices that are connected by an edge. The star clustering algorithm thus establishes that pairs of questions are similar when the similarity between the questions satisfies a threshold similarity and then repeatedly selects an unmarked question that is similar to the greatest number of questions, marks the selected question as a center of a cluster, and marks each previously unmarked similar question as a satellite of the center of the cluster.

The question search system clusters and re-ranks question search results using the algorithm illustrated in Table 5. The output $\{\{FC(TC(C_Q))\}\}$ is a ranked list of topic clusters that each contains a ranked list of focus clusters. Each focus cluster contains a ranked list of questions.

TABLE 5

Given a query Q, a size N, two thresholds $\sigma_1$ and $\sigma_2$:

1. Retrieve a collection of questions ranked as TOP-N for the query Q, denoted as $C_Q$. Let $C'_Q = C_Q \cup Q$.
2. For each question in $C'_Q$, build the topic-focus structure using an MDL-based tree cut model.
3. Use the star clustering algorithm, the threshold $\sigma_1$, and the topic similarity to cluster the questions in $C_Q$ into the topic clusters $\{TC(C_Q)\}$.
4. Rank each cluster $TC(C_Q)$ in $\{TC(C_Q)\}$ according to the rank (in $C_Q$) of the question in $TC(C_Q)$ that is ranked highest.
5. For each cluster $TC(C_Q)$ in $\{TC(C_Q)\}$,
  5.1 Use the star clustering algorithm, the threshold $\sigma_2$, and the focus similarity to cluster the questions in $TC(C_Q)$ into the focus clusters $\{FC(TC(C_Q))\}$.
  5.2 Rank each cluster $FC(TC(C_Q))$ in $\{FC(TC(C_Q))\}$ according to the rank (in $C_Q$) of the question in $FC(TC(C_Q))$ that is ranked highest.
  5.3 Rank each Question Q' in $FC(TC(C_Q))$ according to their original rank in $C_Q$.
6. Output $\{\{FC(TC(C_Q))\}\}$.

This clustering results in a re-ranked list of the TOP-N search results because the questions might be pushed up to the top of the rank list or down to the bottom of the rank list according to the clusters containing them. In some embodiments, the question system may set the similarity thresholds such that $\sigma_1 = \sigma_2 = \sigma$.

FIG. 2 is a diagram that illustrates a display page with a conventional display of search results of a question search. Display page 200 includes the queried question 201 and the questions of the search result 202. The questions of the search result are ranked based on their relevance to the queried questions. The first two questions "Fun clubs in Hamburg or Berlin" and "What are the fun clubs in Berlin or Hamburg" are semantically the same.

Figure 3:
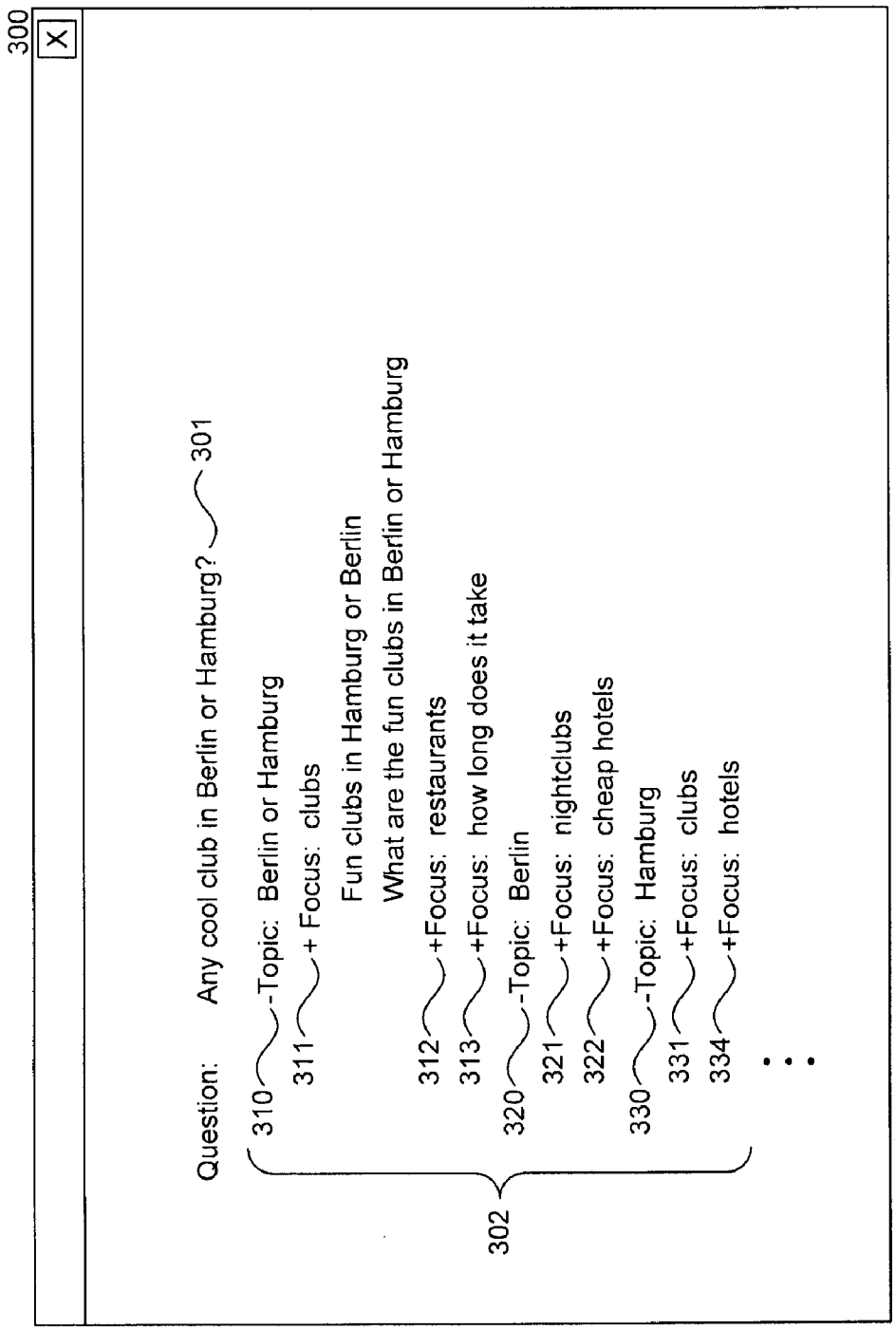
FIG. 3 is a diagram that illustrates a display page with a clustered display of the search result of a question search in some embodiments.

FIG. 3 is a diagram that illustrates a display page with a clustered display of the search result of a question search in some embodiments. Display page 300 includes the queried question 301 and the search result 302 organized into topic clusters 310, 320, and 330 representing the topics "Berlin or Hamburg," "Berlin," and "Hamburg," respectively. Each topic cluster has focus clusters. Topic cluster 310 has focus clusters 311, 312, and 313 representing focuses "clubs," "restaurants," and "how long does it take." Topic cluster 320 has focus clusters 321 and 322 representing focuses "night clubs" and "cheap hotels." Topic cluster 330 has focus clusters 331 and 332 representing focuses "clubs" and "hotels." Focus cluster 311 is currently listing the questions with that cluster. The "+" and the "−" to the left of each topic cluster and focus cluster can be used to expand or collapse the information of the cluster.

Figure 4:
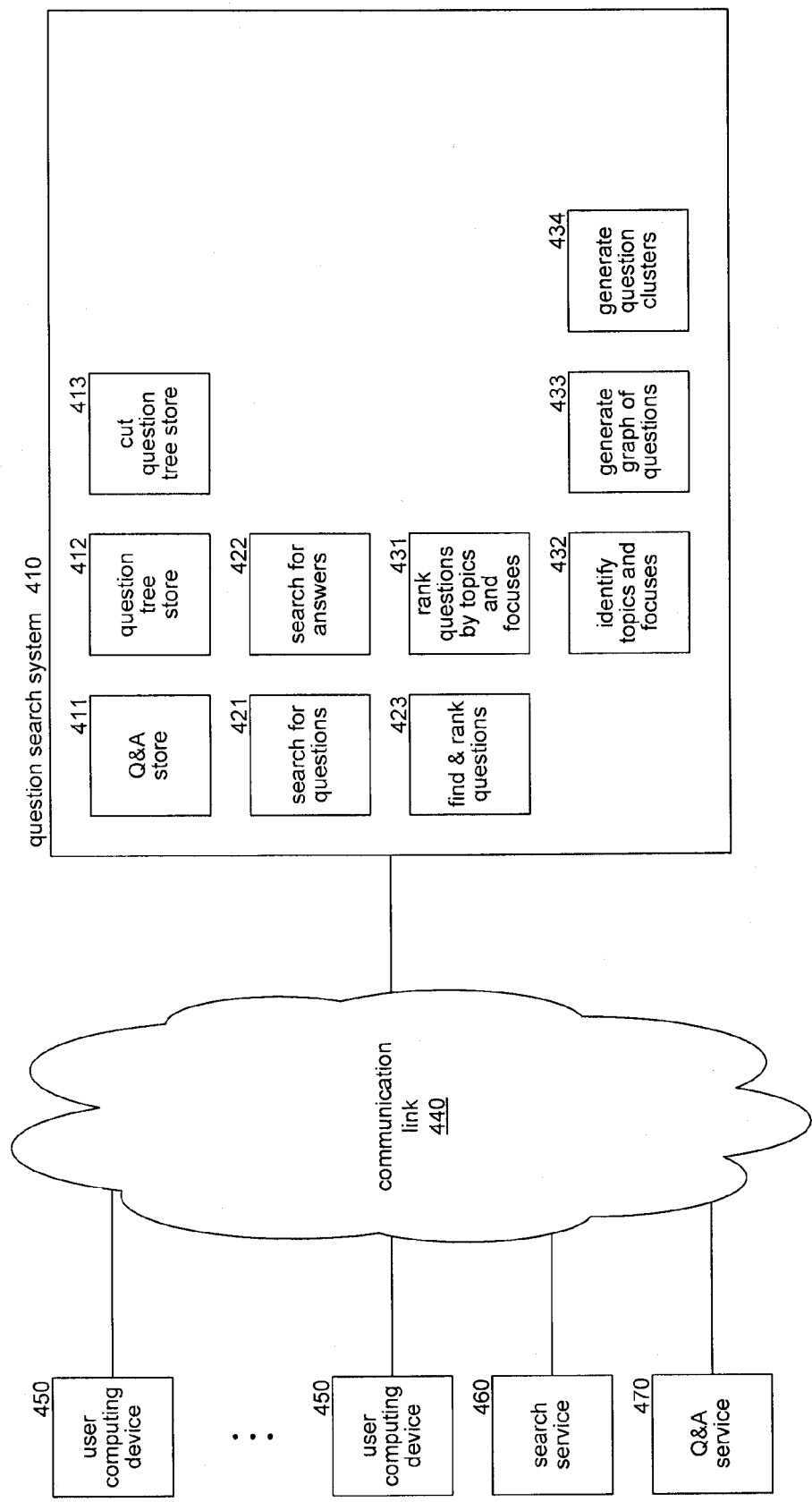
FIG. 4 is a block diagram that illustrates components of the question search system in some embodiments.

FIG. 4 is a block diagram illustrating components of the question search system in some embodiments. A question search system 410 may be connected to user computing devices 450, a search service 460, and a Q&A service 470 via a communication link 440. The question search system includes various data stores including a question/answer store 411, a question tree store 412, and a cut question tree store 413. The question/answer store contains questions and their corresponding answers. The question tree store contains a question tree for the questions of the question/answer store. The cut question tree store indicates the cut of the question tree. The question search system also includes a search for questions component 421, a search for answers component 422, and a find and rank questions component 423. The search for questions component may invoke the find and rank questions component to identify questions relevant to a queried question and then cluster and display the identified questions. The search for answers component may invoke the find and rank questions component to identify questions relevant to a queried question, cluster the identified questions, and display the answers to the questions organized based on the clusters. The question search system also includes a rank questions by topics and focuses component 431, an identify topics and focuses component 432, a generate graph of questions component 433, and a generate question clusters component 434. The rank question by topics and focuses component invokes the identify topics and focuses component to determine the topics and focuses of questions. The rank questions by topics and focuses component also invokes the generate graph of questions component to generate a similarity graph and the generate question clusters component to generate the topic and focus clusters from the graphs.

Figure 9:
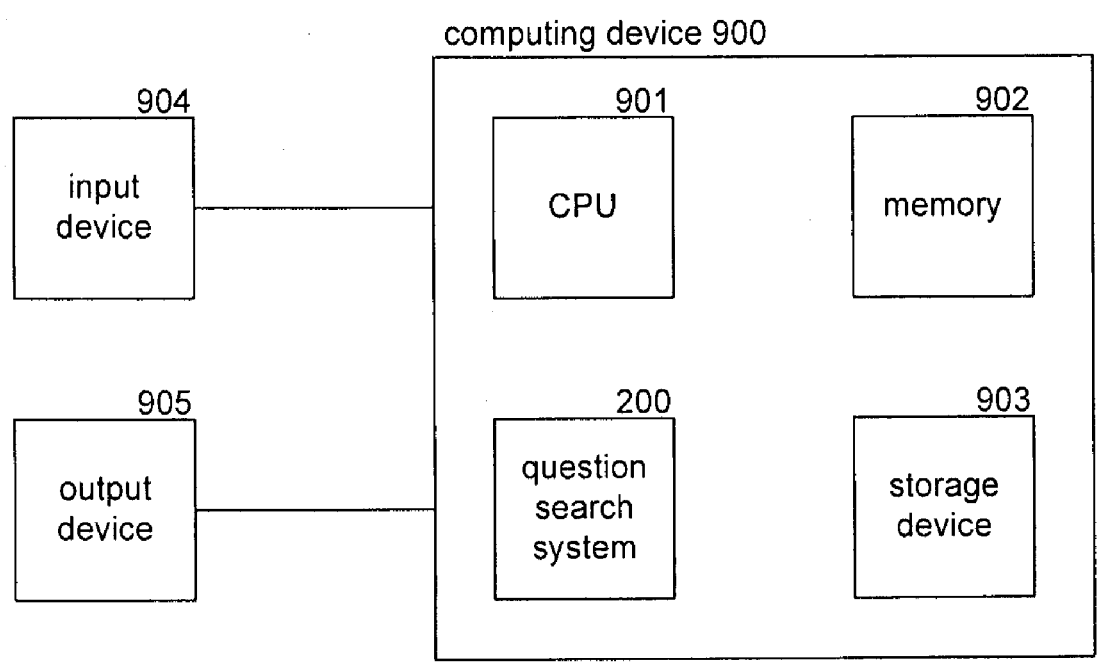
FIG. 9 is a block diagram of a computing device on which the question search system may be implemented.

FIG. 9 is a block diagram of a computing device on which the question search system may be implemented. The computing device 900 on which the question search system 200 may be implemented may include a central processing unit 901, memory 902, input devices 904 (e.g., keyboard and pointing devices), output devices 905 (e.g., display devices), and storage devices 903 (e.g., disk drives). The memory and storage devices are computer-readable media that may contain instructions that implement the question search system. In addition, the data structures and message structures may be stored or transmitted via a data transmission medium, such as a signal on a communications link. Various communications links may be used, such as the Internet, a local area network, a wide area network, or a point-to-point dial-up connection.

The question search system may be implemented in and/or used by various operating environments. The operating environment described herein is only one example of a suitable operating environment and is not intended to suggest any limitation as to the scope of use or functionality of the relevance system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The question search system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 5:
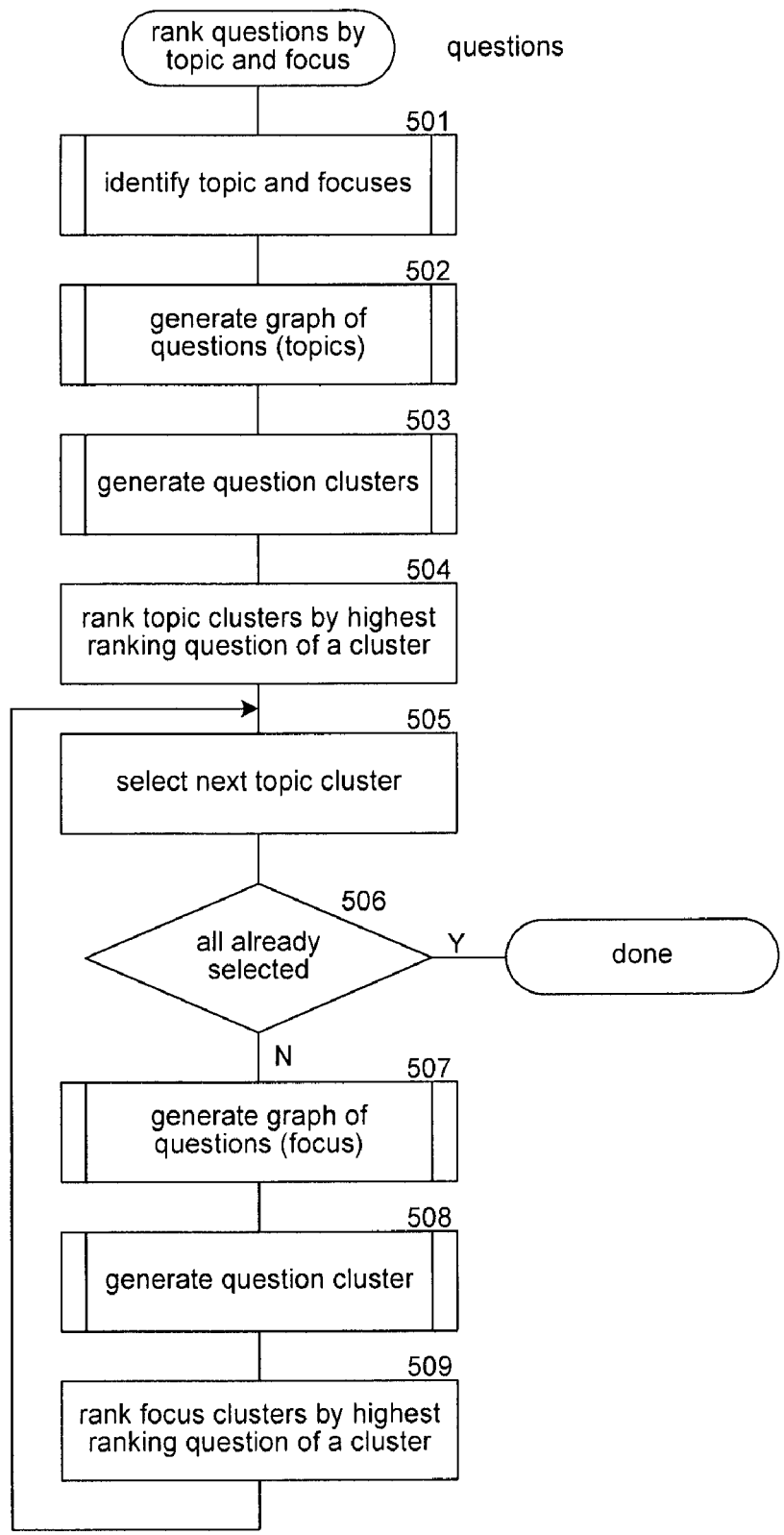
FIG. 5 is a flow diagram that illustrates the processing of the rank questions by topics and focuses component of the question search system in some embodiments.

FIG. 5 is a flow diagram that illustrates the processing of the rank questions by topics and focuses component of the question search system in some embodiments. The component is invoked passing originally ranked questions of a search result that are relevant to a queried question and generates topic and focus clusters for those questions. In block 501, the component invokes the identify topics and focuses component to identify the topics and focuses of the questions. In block 502, the component invokes the generate graph of questions component passing an indication to generate the graph based on the similarity of topics. In block 503, the component invokes the generate question clusters component to generate the clusters for the graph. In block 504, the component ranks the generated clusters based on the highest original ranking of a question within each cluster. In blocks 505-509, the component loops selecting each topic cluster and generating focus clusters within that topic cluster. In block 505, the component selects the next topic cluster. In decision block 506, if all the topic clusters have already been selected, then the component completes, else the component continues at block 507. In block 507, the component invokes the generate graph of questions component passing an indication to generate the graph based on the similarity of focuses. In block 508, the component invokes the generate question clusters component to generate the clusters for the graph. In block 509, the component ranks the focus clusters for the selected topic cluster based on the highest ranking questions of each focus cluster. The component then loops to block 505 to select the next topic cluster.

Figure 6:
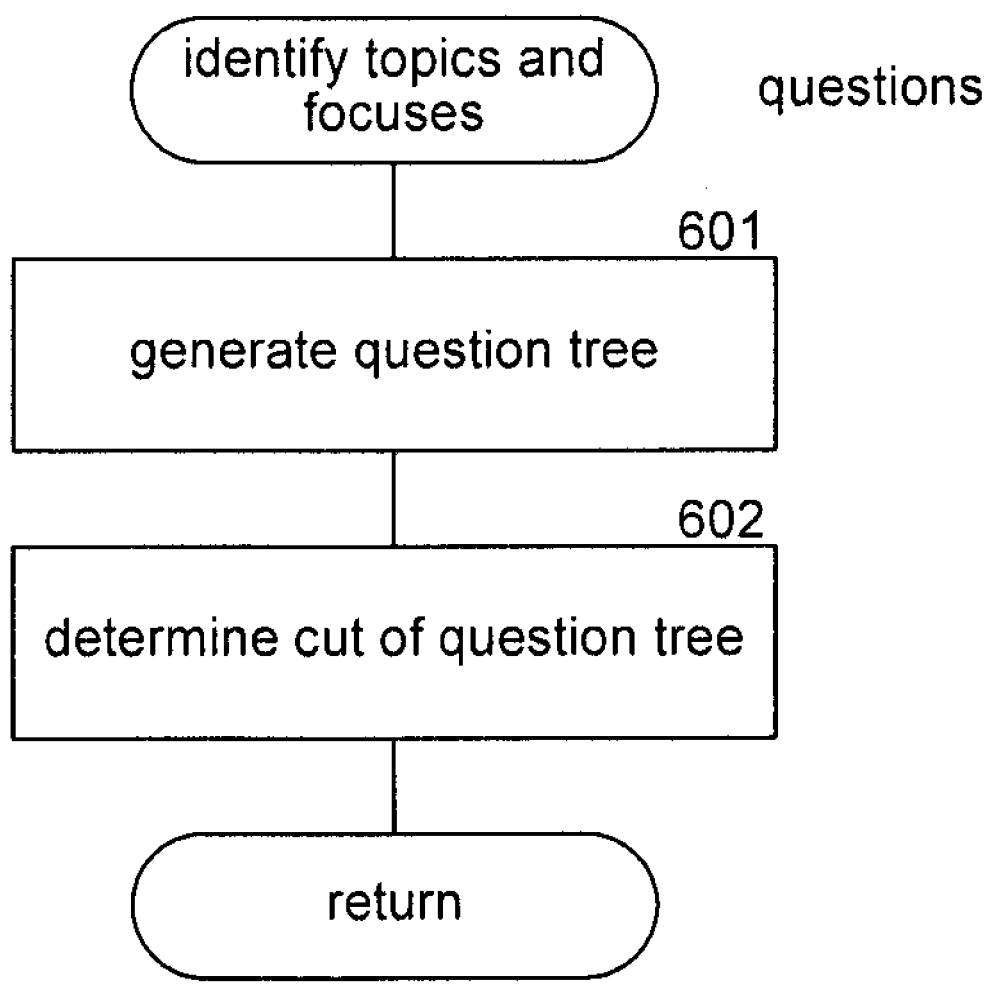
FIG. 6 is a flow diagram that illustrates the processing of the identify topics and focuses component of the question search system in some embodiments.

FIG. 6 is a flow diagram that illustrates the processing of the identify topics and focuses component of the question search system in some embodiments. The component is passed questions and returns the topic and focus of each question. In block 601, the component generates a question tree. In block 602, the component determines the cut of the question tree. The component then returns the terms of each topic chain before its cut as the topic of a question and the terms of each topic chain after its cut as the focus of the question.

Figure 7:
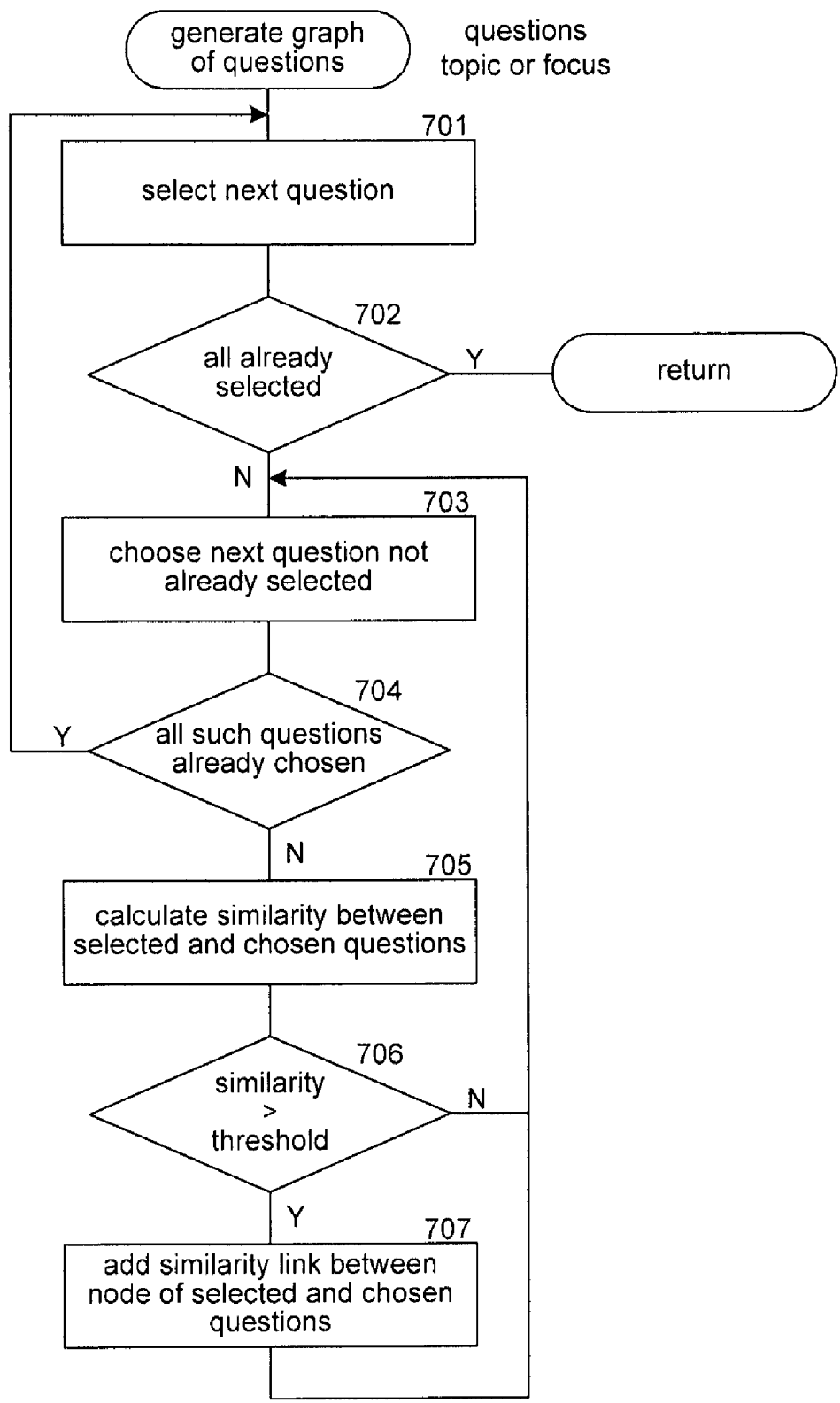
FIG. 7 is a flow diagram that illustrates the processing of the generate graph of questions component of the question search system in some embodiments.

FIG. 7 is a flow diagram that illustrates the processing of the generate graph of questions component of the question search system in some embodiments. The component is passed questions along with an indication to generate a graph for the topic or focus of the questions. In block 701, the component selects the next question. In block 702, if all the questions have already been selected, then the component returns, else the component continues at block 703. In blocks 703-707, the component loops adding links between the selected node and each other node of the graph when the similarity between the nodes is above a similarity threshold. In block 703, the component chooses the next question that has not already been selected. In decision block 704, if all such questions have already been chosen for the selected question, then the component loops to block 701 to select the next question, else the component continues at block 705. In block 705, the component calculates the similarity between the selected and chosen questions. In decision block 706, if the similarity is greater than a threshold similarity, then the component continues at block 707, else the component loops to block 703 to choose the next question. In block 707, the component adds a similarity link between the nodes of the selected and chosen questions and then loops to block 703 to select the next question.

Figure 8:
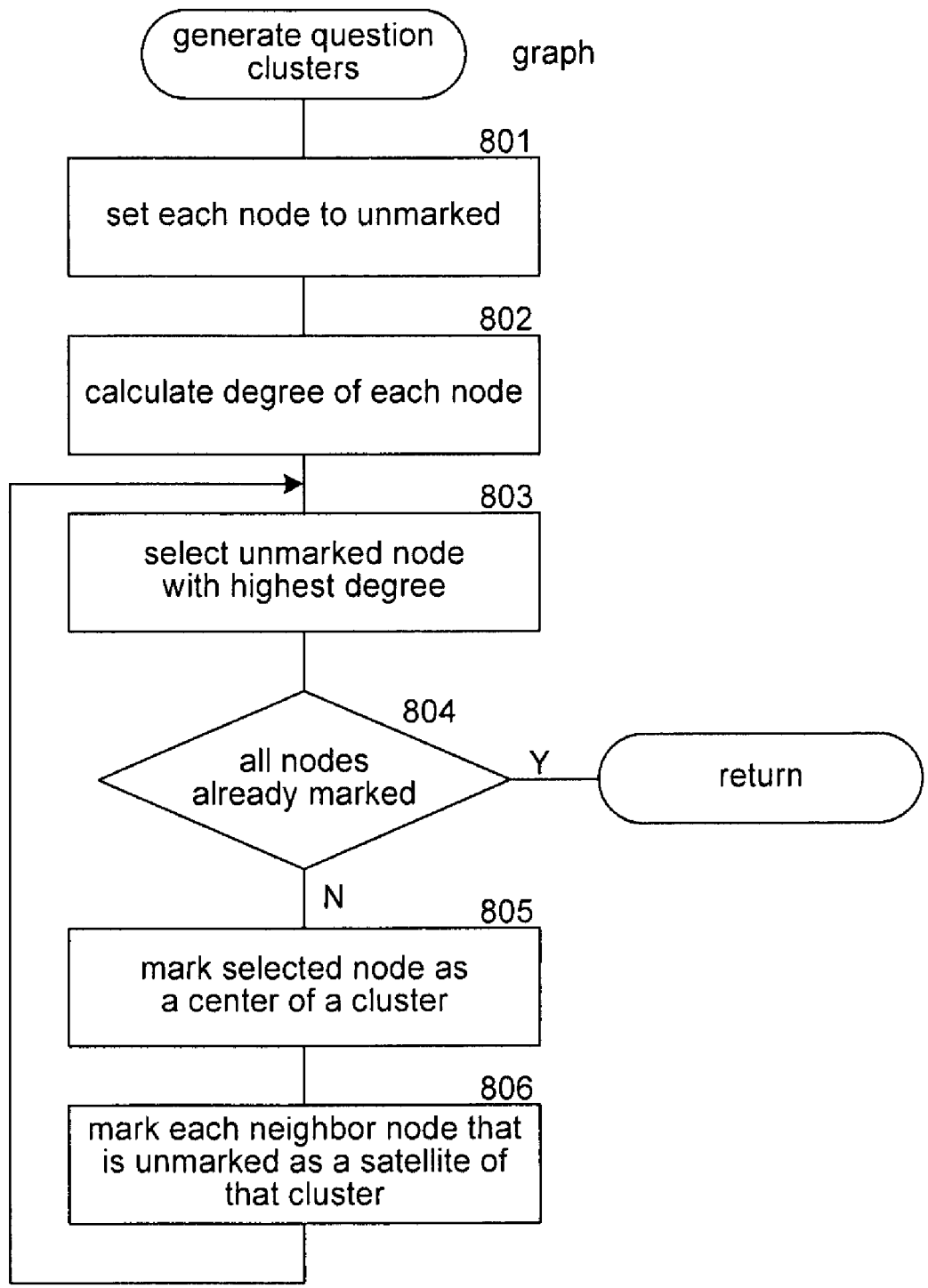
FIG. 8 is a flow diagram that illustrates the processing of the generate question clusters component of the question search system in some embodiments.

FIG. 8 is a flow diagram that illustrates the processing of the generate question clusters component of the question search system in some embodiments. The component is passed a graph and generates clusters for the graph. In block 801, the component sets each node within the graph to be unmarked. In block 802, the component calculates the degree of each node of the graph. In blocks 803-806, the component loops generating star clusters of the nodes. In block 803, the component selects the next unmarked node with the highest degree. In decision block 804, if all such nodes have already been selected, then the component returns an indication of the clusters, else the component continues at block 805. In block 805, the component marks the selected node as a center of a cluster. In block 806, the component marks each neighbor node of the selected node that is unmarked as a satellite of that cluster. The component then loops to block 803 to select the next unmarked node. Each node that is the center of a cluster and all its satellite nodes comprise a cluster.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for presenting questions of a question search, the method comprising:
    providing a collection of questions having terms, each question having a topic of one or more terms of the question and a focus of one or more terms of the question, the topics and focuses of the questions of the collection identified by generating a question tree of the questions of the collection and generating a cut of the question tree, a topic of a question comprising terms of the question before the cut and the focus of a question comprising terms of the question after the cut;
    receiving a queried question;
    identifying by the computing device questions of the collection that are relevant to the queried question;
    providing a search result with identified questions of the collection that are relevant to the queried question, the identified questions of the search result being originally ranked based on relevance to the queried question;
    re-ranking by the computing device the search result by:
        generating topic clusters of the identified questions of the search result based on similarity between the topics of the identified questions and using a star clustering algorithm;
        for each topic cluster of questions,
            generating focus clusters of the identified questions within the topic cluster; and
            ranking the focus clusters within the topic cluster based on the identified question within each focus cluster with the highest original rank; and
    displaying as search result information organized based on the topic clusters and the ranked focus clusters within a topic cluster.

2. The method of claim 1 wherein the displayed information includes an indication of the topic of a topic cluster and the focus of a focus cluster.

3. The method of claim 2 wherein the displayed information includes the identified questions within each focus cluster.

4. The method of claim 1 wherein the displayed information includes answers to each identified question.

5. The method of claim 1 wherein the generating of a cluster includes:
    establishing that pairs of identified questions are similar when the similarity between the identified questions satisfies a threshold similarity; and
    repeatedly selecting an unmarked question that is similar to the greatest number of questions, marking the selected question as a center of a cluster, and marking each previously unmarked similar question as a satellite of the center of the cluster.

6. The method of claim 1 wherein the cut is based on minimum description length.

7. A computer-readable storage medium containing instructions for controlling a computing device to present questions of a question search, by a method comprising:
    providing a collection of questions, each question having terms, each question having a topic and a focus, the topics and focuses of the questions of the collection identified by generating a question tree of the questions of the collection and generating a cut of the question tree, a topic of a question comprising terms of the question before the cut and the focus of a question comprising terms of the question after the cut;
    receiving a queried question;
    identifying questions of the collection that are relevant to the queried question;
    generating an original ranking of the identified questions based on relevance to the queried question;
    re-ranking the identified questions by:
        generating topic clusters of the identified questions based on similarity between the topics of the questions and using a star clustering algorithm;
        ranking the topic clusters based on the question within each topic cluster with the highest original ranking;
        for each topic cluster of questions,
            generating focus clusters of the questions within the topic cluster based on similarity between the focuses of the questions and using a star clustering algorithm; and
            ranking the focus clusters within the topic cluster based on the question within each focus cluster with the highest original ranking; and displaying the identified questions organized based on the topic clusters and focus clusters within a topic cluster.

8. The computer-readable storage medium of claim 7 including displaying an indication of the topic of a topic cluster and the focus of a focus cluster.

9. The computer-readable storage medium of claim 8 including displaying the questions within a focus cluster.

10. The computer-readable storage medium of claim 7 including displaying answers to a question.

11. The computer-readable storage medium of claim 7 wherein the generating of a cluster includes:
establishing that pairs of questions are similar when the similarity between the questions satisfies a threshold similarity; and
repeatedly selecting an unmarked question that is similar to the greatest number of questions, marking the selected question as a center of a cluster, and marking each previously unmarked similar question as a satellite of the center of the cluster.

12. The computer-readable storage medium of claim 7 wherein the topics and focuses of the questions of the collection are identified by generating a question tree of the questions of the collection and generating a cut of the question tree.

13. The computer-readable storage medium of claim 12 wherein each question is represented by a term chain within the question tree, the topic of a question comprises the terms before the cut of the term chain, and the focus of a question comprises the terms after the cut of the term chain.

14. A computing device for clustering questions of a question search, comprising:
a collection of questions having terms, each question having a topic of one or more terms of the question and a focus of one or more terms of the question, the topics and focuses of the questions of the collection identified by generating a question tree of the questions of the collection and generating a cut of the question tree, a topic of a question comprising terms of the question before the cut and the focus of a question comprising terms of the question after the cut;
a memory storing computer-executable instructions of:
a component that receives an identification of questions of the collection that are relevant to a queried question, the identified questions being originally ranked based on relevance to the queried question;
a component that re-ranks the identified questions by:
generating topic clusters of the identified questions based on similarity between the topics of the identified questions and using a star clustering algorithm; and
for each topic cluster of identified questions,
generating focus clusters of the identified questions within the topic cluster; and
ranking the focus clusters within the topic cluster based on the identified questions within each focus cluster with the highest original rank; and
a component that displays the identified questions based on the topic clusters and the ranking of the focus clusters within a topic cluster; and
a processor that executes the computer-executable instructions stored in the memory.

* * * * *

UNITED STATES PATENT AND TRADEMARK OFFICE
CERTIFICATE OF CORRECTION

PATENT NO.       : 8,024,332 B2
APPLICATION NO.  : 12/185702
DATED            : September 20, 2011
INVENTOR(S)      : Yunbo Cao et al.

It is certified that error appears in the above-identified patent and that said Letters Patent is hereby corrected as shown below:

In Page 2, in field (56), under "Other Publications" column 1, line 6, below "pp. 490-499." insert
-- JEON et al., "Finding Semantically Similar Questions Based on Their Answers," SIGIR'05, August 15-19, 2005, Salvador, Brazil, 2 Pages. --.

Signed and Sealed this
Twenty-ninth Day of November, 2011

David J. Kappos
*Director of the United States Patent and Trademark Office*